United States Patent [19]

Kurihara

[11] Patent Number: 4,876,911
[45] Date of Patent: Oct. 31, 1989

[54] REMOTELY CONTROLLED MIRROR DEVICE OF WIRE TYPE

[75] Inventor: Kenji Kurihara, Yamato, Japan

[73] Assignee: Nissan Motor Co., Ltd., Yokohama, Japan

[21] Appl. No.: 232,945

[22] Filed: Aug. 17, 1988

Related U.S. Application Data

[63] Continuation of Ser. No. 943,758, Dec. 19, 1986, abandoned.

[30] Foreign Application Priority Data

Dec. 30, 1985 [JP] Japan .............................. 60-204066[U]

[51] Int. Cl.$^4$ ................................................ F16C 1/10
[52] U.S. Cl. .................................................... 74/502.1
[58] Field of Search ............. 74/502.1, 500.5, 501.5 R

[56] References Cited

U.S. PATENT DOCUMENTS

| | | |
|---|---|---|
| 3,057,262 | 10/1962 | Jacobson .............................. 74/502.1 |
| 3,369,427 | 2/1968 | Brighton et al. .................... 74/502.1 |
| 3,407,684 | 10/1968 | Van Noord ......................... 74/502.1 |
| 3,420,118 | 1/1969 | Dudley ................................ 74/502.1 |
| 3,659,477 | 5/1972 | Wehner .............................. 74/502.1 |
| 3,933,058 | 1/1976 | Kraine ................................ 74/502.1 |
| 4,250,767 | 2/1981 | Bottrill .............................. 74/502.1 |
| 4,278,227 | 7/1981 | Davis et al. ......................... 74/502.1 |
| 4,475,414 | 10/1984 | Manzoni ............................. 74/502.1 |
| 4,809,561 | 3/1989 | Tsuyama ............................ 74/502.1 |

FOREIGN PATENT DOCUMENTS

| | | | |
|---|---|---|---|
| 2642117 | 3/1978 | Fed. Rep. of Germany ..... 74/502.1 |
| 3041692 | 5/1981 | Fed. Rep. of Germany ..... 74/502.1 |
| 2389514 | 1/1979 | France ............................... 74/502.1 |
| 48-9897 | 3/1973 | Japan ................................. 74/502.1 |
| 1400457 | 7/1975 | United Kingdom ............... 74/502.1 |

Primary Examiner—Vinh Luong
Attorney, Agent, or Firm—Foley & Lardner, Schwartz, Jeffery, Schwaab, Mack, Blumenthal & Evans

[57] ABSTRACT

A plurality of bowden cables extend between a pivotal mirror unit and a control device so that the mirror unit is pivotally movable in response to manipulation of the control device. A spring-biased wire guide member engages the bowden cables in a manner to constantly apply the same with substantially equal tensions to achieve assured remote control.

11 Claims, 2 Drawing Sheets

4,876,911

REMOTELY CONTROLLED MIRROR DEVICE OF WIRE TYPE

This application is a continuation of application Ser. No. 943,758, filed Dec. 19, 1986, now abandoned.

BACKGROUND OF THE INVENTION

1. Field of the Invention

The present invention relates in general to mirror devices of a type which is remotely controlled through wires, and more particularly to a mirror device which is equipped with a wire tensioning device for tensioning the wires to achieve assured remote control.

2. Description of the Prior Art

In order to clarify the task of the present invention, one conventional remotely controlled mirror device of wire type will be described with reference to FIG. 3 of the accompanying drawings.

Referring to the drawing, there is shown the conventional device 100, which is disclosed in Japanese Patent Second Provisional Publication No. 48-9897.

The conventional device 100 comprises a stay 11 fixed to, for example, a front side panel of a vehicle body (not shown), to which a mirror housing 12 is secured through bolts 14. Stationarily disposed within the mirror housing 12 is a mirror holder 16 which is connected to the stay 11 through a bracket 18. The mirror holder 16 is formed with a spherical projection 16a. Pivotally disposed in the mirror housing 12 is a mirror unit which comprises a mirror plate 20 and a back plate 22. As shown, the back plate 22 is formed at its thicker central portion with a spherical recess 22a into which the spherical projection 16a of the mirror holder 16 is slidably received in a manner to provide therebetween an articulated connection. The mirror unit is thus pivotal about the spherical projection 16a in universal directions.

Three flexible wires 24, 26 and 28 extend between the mirror unit and a control device 30 which is positioned at a distance from the mirror housing 12. The control device 30 has a control knob 32 projecting into a driver's cabin of the vehicle. Each wire 24, 26 or 28 is connected at one end to the mirror unit and passes through an opening 16b formed in the mirror holder 16 and through a tension adjuster 38, 40 or 42 and through an opening 36a formed in a body 36 of the control device 30 and is finally connected to a universally pivoting member 34 of the control device 30. In the disclosed example, the wires 24 and 26 pass through a common opening 36a of the control device 30.

Each wire 24, 26 or 28 is slidably received in a shield tube 44, 46 or 48 constructed of a closely spiralled wire. Thus, the wire and the shield tube constitute a bowden cable. The shield tube 44, 46 or 48 is divided into two parts, one extending between the mirror holder 16 and one end of the tension adjuster 38, 40 or 42, and the other extending between the other end of the tension adjuster 38, 40 or 42 and the body 36 of the control device 30.

Each tension adjuster 38, 40 or 42 has a longitudinally extending bore 38a, 40a or 42a the opposed end portions of which are threaded in mutually opposed directions. The inward ends of the two parts of each shield tube 44, 46 or 48 are screwed into the threaded bores of the tension adjuster 38, 40 or 42 from opposite directions.

Thus, it will be appreciated that when the control knob 32 of the control device 30 is manipulated, the three wires 24, 26 and 28 are moved longitudinally in the associated shield tubes 44, 46 and 48 forward or rearward thereby to pivotally move the mirror unit about the spherical projection 16a in the mirror housing 12. It will be further appreciated that by turning the tension adjuster 38, 40 or 42 about the axis thereof in a given direction, the entire length of the shield tube 44, 46 or 48 including the length of the adjuster is increased or decreased with respect to the associated wire 24, 26 or 28, thereby adjusting a tension applied to the wire.

However, due to its inherent construction, the conventional device 100 is subjected to the following drawbacks.

That is, as is described hereinabove, the tension adjustment of each wire must be carried out by awkwardly turning the tension adjuster by a certain degree, depending upon the technical experience possessed by an operator. This adjusting method, however, tends to produce a considerable difference in turning angle of each tension adjuster among the persons who manipulate the adjusters 38, 40 and 42. Furthermore, the setting of the mirror unit to its neutral position must be carried out by manipulating the three tension adjusters individually. This is troublesome and time-consuming work.

SUMMARY OF THE INVENTION

It is therefore an essential object of the present invention to provide a remotely controlled mirror device of wire type which is free of the drawbacks encountered in the above-mentioned conventional mirror device.

According to the present invention, there is provided, in a mirror device remotely controlled by a control device, an arrangement which comprises a mirror housing, a mirror unit pivotally disposed in the mirror housing, a plurality of same wire assemblies each including a wire and a shield tube in which the wire is longitudinally slidable, the wire assemblies extending between the mirror unit and the control device so that the mirror unit is pivotally movable in response to manipulation of the control device, a wire guide member movably disposed in the mirror housing and having a plurality of curved surfaces to which the wire assemblies slidably contact respectively, and biasing means for biasing the wire guide member in a direction to apply the wire assemblies with substantially equal tensions.

DETAILED DESCRIPTION OF THE INVENTION

In the following, a remotely controlled mirror device 10 of wire type according to the invention will be described in detail with reference to FIGS. 1 and 2. For ease of understanding, the same parts as those of the conventional device of FIG. 3 are designated by the same numerals.

Figure 1:
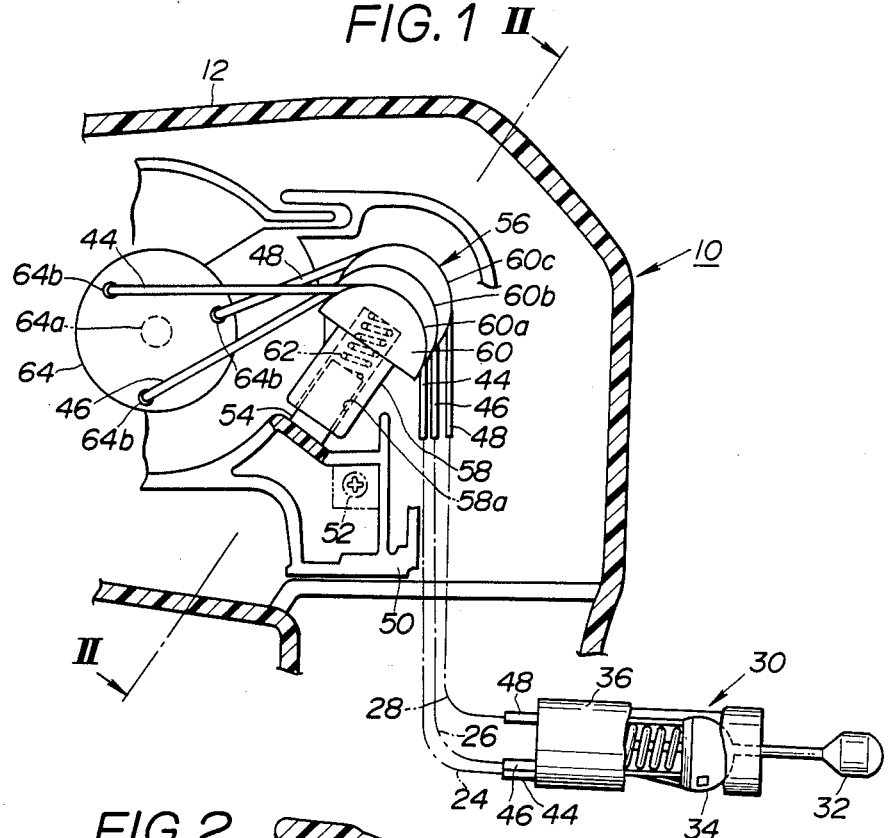
FIG. 1 is a partial sectional view of a remotely controlled mirror device of wire type according to the present invention.
Figure 2:
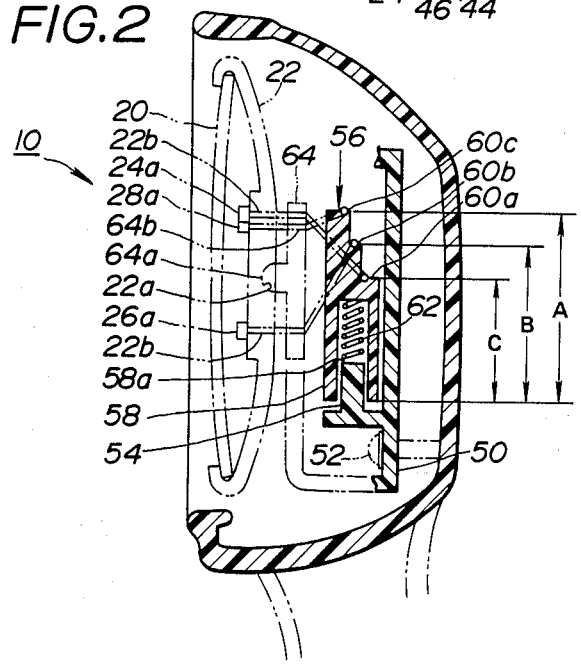
FIG. 2 is a sectional view taken along the line II—II of FIG. 1.
Figure 3:
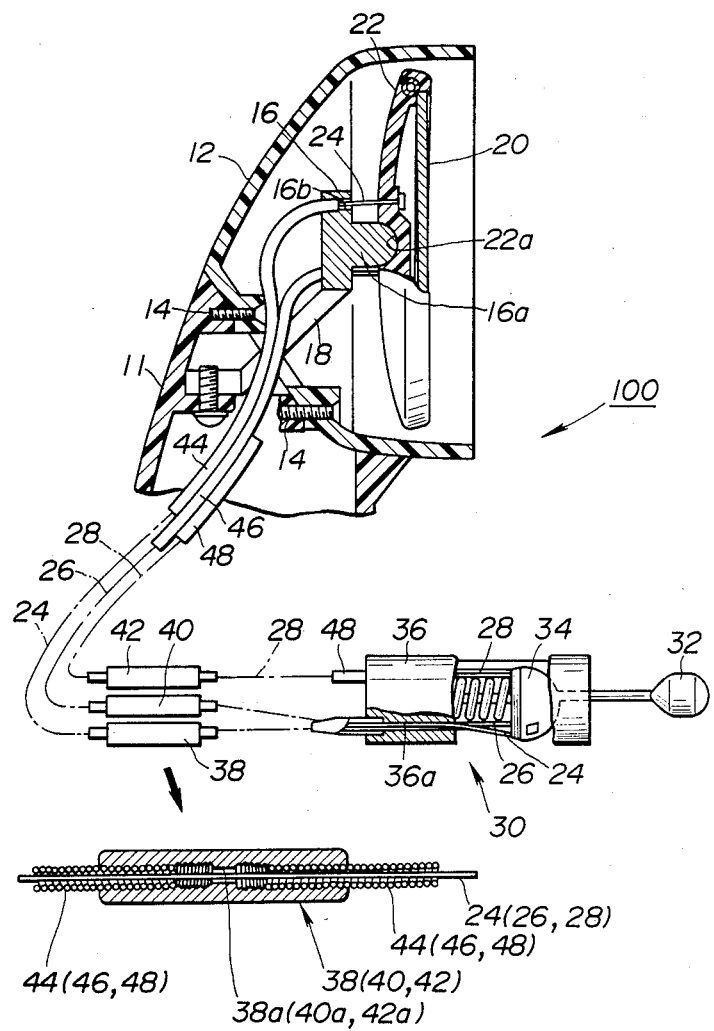
FIG. 3 is a partial sectional view of a conventional remotely controlled mirror device of wire type, which has been described hereinabove.

Referring to FIGS. 1 and 2, there is shown the remotely controlled mirror device 10 of the invention, which comprises a mirror housing 12 secured to a suitable portion of a vehicle body (not shown). Stationarily disposed in the mirror housing 12 is a bracket 50 which is secured to the mirror housing 12 through bolts 52 (only one is shown). The bracket 50 is integrally formed with a stud portion 54. Designated by numeral 56 is a wire guide member which constitutes a part of a wire tensioning device as will become apparent as the description proceeds. As will be seen from FIG. 1, the wire guide member 56 comprises a rectangular parallelepiped hollow base portion 58 and a semicircular stepped portion 60. The stepped portion 60 includes first, second and third semicircular steps 60a, 60b and 60c which are arranged on the same side in this order. In the illustrated embodiment, the distance between the bottom of the hollow base portion 58 and the top of each semicircular step is increased with the order of the first, second and third semicircular steps 60a, 60b and 60c. As is well seen from FIG. 2, the stud portion 54 of the bracket 50 is slidably put in the hollow 58a of the wire guide member 56 for slidably supporting thereon the wire guide member 56. A coil spring 62 is disposed in the hollow 58a for biasing the wire guide member 56 away from the stud portion 54.

As is well understood from FIG. 1, the bracket 50 is further formed with a mirror holder portion 64 which is positioned beside the wire guide member 56. The holder portion 64 is formed with a spherical projection 64a which, similar to the afore-mentioned conventional device 100, is slidably disposed in a spherical recess 22a formed in the back frame 22 of a mirror unit. A mirror plate 20 is supported by the back frame 22.

Three flexible wires 24, 26 and 28 extend between the mirror unit and the control device 30. Each wire 24, 26 or 28 is connected at one end to the mirror unit and passes through an opening 64b formed in the holder portion 64 and is put on the semicircular step 60a, 60b or 60c of the wire guide member 56 and passes through an opening formed in the body 36 of the control device 30 and is finally connected to the universarily pivoting member 34 of the control device 30. Due to the biasing force produced by the coil spring 62, the wire guide member 56 is biased away from the stud portion 54 of the bracket 50 thereby tensioning the wires 24, 26 and 28. As is seen from FIG. 2, each wire 24, 26 or 28 has an enlarged stopper head 24a, 26 or 28a which, upon assembly, is pressed against the inside surface of the back frame 22 of the mirror unit because of the tension applied to the wire.

Each wire 24, 26 or 28 is slidably received in a shield tube 44, 46 or 48 which is constructed of a closely spiralled wire. The wire and the shield tube thus constitute a bowden cable. The shield tube 44, 46 or 48 extends between the mirror holder portion 64 of the bracket 50 and the body 36 of the control device 30. That is, one end of the shield tube 44, 46 or 48 is secured to the opening 64b of the mirror holder portion 64, and the other end of the shield tube is secured to an opening formed in the body 36 of the control device 30. It is to be noted that the first, second and third semicircular steps 60a, 60b and 60c of the wire guide member 56 are so sized and arranged that upon assembly, the travelling passes for the wires 24, 26 and 28 incorporated therewith have the same lengths. With this, the same wire assemblies can be used for the three wirings between the mirror unit and the control device 30. This is achieved by suitably determining the lengths "A", "B" and "C" (see FIG. 2) each being a distance between the top of the semicircular step 60a, 60b or 60c of the wire guide member 56 and the lower end of the same.

When, in operation, the control knob 32 of the control device 30 is manipulated by an operator in the driver's cabin, the three wires 24, 26 and 28 are moved forward or rearward in the associated shield tubes 44, 46 and 48 thereby to pivotally move the mirror unit about the spherical projection 64a of the mirror holding portion 64 into a desired angular position.

The setting of the wire assemblies is made in the following manner.

First, one end of each wire 24, 26 or 28 is passed leftward, as viewed in FIG. 2, through the opening 64b of the mirror holder portion 64 and then through an opening 22b formed in the back frame 22 of the mirror unit with the enlarged stopper head 24a, 26a or 28a inclined. Upon the stopper head projecting sufficiently into the interior of the mirror unit, the wire is pulled rightward causing the associated stopper head to be raised up and brought into engagement with the inside surface of the back frame 22 of the mirror unit. Then, one end of the associated shield tube 44, 46 or 48 is fixed or screwed to the opening 64b of the mirror holder portion 64. Then, the other end of the wire 24, 26 or 28 is passed through the opening of the body 36 of the control device 30 and connected to the universally pivoting member 34 of the same, and the other end of the shield tube 44, 46 or 48 is secured to the opening of the body 36 of the control device 34. Then, the three wire assemblies are put on the first, second and third semicircular steps 60a, 60b and 60c of the wire guide member 56 respectively against the biasing force which is applied to the guide member 56 by the coil spring 62. With this, the shield tubes 44, 46 and 48 are equally tensioned thereby causing the associated wires 24, 26 and 28 to pull the mirror unit with equal forces and thus bringing the mirror unit to its well-balanced neutral position.

In accordance with the present invention, the following advantages are expected, which are:

Since, as is described hereinabove, the wire setting can be made easily without need of experienced technique of an operator, the assembling work is facilitated.

Because of provision of the spring-biased wire guide member 56 having the above-mentioned unique configuration, the same wire assemblies can be commonly used for the three wirings between the mirror unit and the control device. This induces reduction in part's variety and thus reduction in cost.

What is claimed is:

1. A mirror device remotely controlled by a control device, comprising:
   a mirror housing;
   a mirror unit pivotally disposed in said mirror housing;
   a plurality of wire assemblies each including a wire and a shield tube in which said wire is longitudinally slidable, each wire assembly extending between said mirror unit and said control device so that said mirror unit and said control device so that said mirror unit is pivotally movable in response to manipulation of said control device;
   a wire guide member mounted in said mirror housing, said wire guide member having a base portion resiliently mounted on a stud portion, said base portion having a plurality of stepped curved surfaces which said wire assemblies slidably contact respectively; and resilient means for resiliently urging said base portion in a direction away from said stud portion to cause said curved surfaces of said wire guide member to simultaneously press said wire assemblies and thereby apply tension to said wire assemblies, said curved surfaces being so stepped and constructed having different radii of curvature as to apply said wire assemblies with substantially equal tension.

2. A mirror device as claimed in claim 1, wherein said curved surfaces are semicircular.

3. A mirror device as claimed in claim 2, in which said base portion has therein a hollow into which said stud extending from said mirror housing is slidably received.

4. A mirror device as claimed in claim 3, in which said hollow of said base portion of said wire guide member receives therein said resilient means.

5. A mirror device as claimed in claim 4, in which said resilient means is a coil spring which is compressed between the bottom of said hollow and the top of said stud.

6. A mirror device as claimed in claim 5, in which said stud is a part of a bracket which is secured to said mirror housing.

7. A mirror device as claimed in claim 6, in which said bracket has a projection about which said mirror unit is pivotally moved.

8. A mirror device as claimed in claim 7, in which one end of each wire assembly is connected to said bracket and the other end of the same is connected to a body of said control device.

9. A mirror device as claimed in claim 8, in which said wire assemblies comprise a bowden cable.

10. A mirror device as claimed in claim 8, in which one end of each wire is fixed to said mirror unit and the other end of the same is connected to a movable member of said control device, and in which one end of each shield tube is fixed to a part of said bracket and the other end of the same is fixed to a stationary member of said control device.

11. A mirror device as claimed in claim 1, wherein all of said wire assemblies are of the same length.

* * * * *